US011815066B2

(12) United States Patent
Von Aswege

(10) Patent No.: US 11,815,066 B2
(45) Date of Patent: Nov. 14, 2023

(54) METHOD FOR OPERATING A WIND TURBINE, CONTROLLER, WIND TURBINE AND WIND FARM

(71) Applicant: Wobben Properties GmbH, Aurich (DE)

(72) Inventor: Enno Von Aswege, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 253 days.

(21) Appl. No.: 17/435,599

(22) PCT Filed: Feb. 28, 2020

(86) PCT No.: PCT/EP2020/055313
§ 371 (c)(1),
(2) Date: Sep. 1, 2021

(87) PCT Pub. No.: WO2020/178182
PCT Pub. Date: Sep. 10, 2020

(65) Prior Publication Data
US 2022/0154689 A1    May 19, 2022

(30) Foreign Application Priority Data
Mar. 1, 2019    (DE) .................... 10 2019 105 296.3

(51) Int. Cl.
*F03D 7/02* (2006.01)
*F03D 7/04* (2006.01)

(52) U.S. Cl.
CPC ......... *F03D 7/0224* (2013.01); *F03D 7/0276* (2013.01); *F03D 7/0296* (2013.01);
(Continued)

(58) Field of Classification Search
CPC .. F03D 7/0224; F03D 7/0296; F05B 2260/71; F05B 2260/96; F05B 2270/1016;
(Continued)

(56) References Cited

U.S. PATENT DOCUMENTS

| 4,435,647 A | 3/1984 | Harner et al. |
| 6,891,280 B2 * | 5/2005 | Siegfriedsen ......... F03D 7/0296 290/51 |

(Continued)

FOREIGN PATENT DOCUMENTS

| DE | 3308564 A1 | 10/1983 |
| DE | 102017105165 A1 | 9/2018 |

(Continued)

*Primary Examiner* — Pedro J Cuevas
(74) *Attorney, Agent, or Firm* — Seed IP Law Group LLP

(57) ABSTRACT

A method for operating a wind turbine is provided. The wind turbine has a tower with external tower loads acting thereon and has an aerodynamic rotor with rotor blades having adjustable pitch angles, which rotor generates rotor thrust. The method comprises the following steps: determining a speed of a tower head of the tower and/or of a nacelle of the wind turbine, determining an absolute wind speed in the region of the wind turbine, determining a pure wind power on the rotor on the basis of the absolute wind speed, determining an apparent wind power on the rotor on the basis of the speed of the tower head and/or of the nacelle, determining an aerodynamic tower vibration power on the basis of a difference between the apparent wind power and the pure wind power, and performing feedback control of the wind turbine using the aerodynamic tower vibration power.

28 Claims, 5 Drawing Sheets

(52) U.S. Cl.
CPC .......... *F03D 7/043* (2013.01); *F05B 2260/71* (2013.01); *F05B 2260/8211* (2013.01); *F05B 2260/96* (2013.01); *F05B 2270/1016* (2013.01); *F05B 2270/32* (2013.01); *F05B 2270/328* (2013.01); *F05B 2270/334* (2013.01)

(58) Field of Classification Search
CPC ............ F05B 2270/32; F05B 2270/328; F05B 2270/334
See application file for complete search history.

(56) References Cited

U.S. PATENT DOCUMENTS

| | | | | |
|---|---|---|---|---|
| 7,400,055 | B2* | 7/2008 | Nagao | F03D 7/042 |
| | | | | 290/55 |
| 8,022,566 | B2* | 9/2011 | Loh | F03D 7/0272 |
| | | | | 416/85 |
| 8,044,529 | B2* | 10/2011 | Egedal | F03D 7/0276 |
| | | | | 290/55 |
| 8,482,143 | B2* | 7/2013 | Drossel | F03D 7/0296 |
| | | | | 290/55 |
| 8,816,871 | B2* | 8/2014 | Drossel | F03D 17/00 |
| | | | | 290/55 |
| 11,098,695 | B2* | 8/2021 | Nielsen | F03D 17/00 |
| 11,286,636 | B2* | 3/2022 | Bartminn | F03D 13/22 |
| 11,300,107 | B2* | 4/2022 | Hawkins | F03D 7/0276 |
| 2009/0250932 | A1 | 10/2009 | Egedal | |
| 2010/0063769 | A1 | 3/2010 | Egedal | |
| 2011/0316277 | A1 | 12/2011 | Skaare et al. | |
| 2012/0056427 | A1 | 3/2012 | Drossel | |
| 2012/0139740 | A1* | 6/2012 | Drossel | F03D 17/00 |
| | | | | 340/658 |
| 2013/0187383 | A1* | 7/2013 | Esbensen | F03D 7/00 |
| | | | | 290/44 |
| 2014/0297052 | A1 | 10/2014 | Pineda Amo | |
| 2015/0354532 | A1 | 12/2015 | Nielsen et al. | |
| 2020/0088165 | A1* | 3/2020 | Nielsen | F03D 7/0224 |
| 2021/0262441 | A1 | 8/2021 | Jacobsen | |
| 2022/0325695 | A1* | 10/2022 | Serna Garcia-Conde | |
| | | | | F03D 7/0224 |
| 2023/0054921 | A1* | 2/2023 | Skaare | F03D 13/25 |

FOREIGN PATENT DOCUMENTS

| | | | | |
|---|---|---|---|---|
| EP | 2107236 | A1 * | 10/2009 | ........... F03D 7/0224 |
| EP | 2115299 | B1 | 3/2011 | |
| EP | 2679810 | A2 | 1/2014 | |
| EP | 2063110 | B1 | 8/2015 | |
| WO | 2008/023990 | A1 | 2/2008 | |

* cited by examiner

METHOD FOR OPERATING A WIND TURBINE, CONTROLLER, WIND TURBINE AND WIND FARM

BACKGROUND

Technical Field

The present invention relates to a method for operating a wind turbine, to a feedback controller structure, to a wind turbine and to a wind farm.

Description of the Related Art

Wind turbines are known. Various concepts or control strategies have been proposed for the operation of such installations, one of which is so-called rotational speed feedback control, which in particular pursues the aim of achieving an optimized level of power through feedback control of the rotational speed of the rotor of the wind turbine, without generating excessive loads or rotational speeds in the process.

It is known that tower vibrations are undesirable or even dangerous for the structural integrity and the loads of wind turbines, such that active systems for damping tower vibrations have been developed. A tower vibration leads to a falsification of the wind speed "experienced" by the wind turbine. When the tower vibrates forward, the relative wind speed increases by the component of the tower head speed (and vice versa).

A forward vibration of the tower therefore leads to an increase in the aerodynamic rotor power (more wind) and thus in the rotational speed. As a result, the rotational speed feedback control would pitch the rotor blades back somewhat, which however relieves the tower of load and thus intensifies the tower vibration. In conjunction with the tower head speed, one could also speak of a (measurable) disturbance variable. Known rotational speed feedback control regimes are disturbed by the resulting tower vibrations, such that the rotational speed feedback control regimes themselves constitute sources of (further) excitation of tower vibrations.

DE 33 08 564 A1 relates to the damping of the primary bending mode of a tower of a wind turbine, wherein a blade pitch angle reference signal for influencing the pitch angle of the turbine blades by means of a blade adjustment device in order to keep the power level constant is provided by a feedback control device. This is performed by generation of the blade pitch angle reference signal as an integral of the sum of a blade pitch angle reference speed signal, which implements feedback control of a torque/power, with an estimated acceleration signal, which is generated by filtering of the blade pitch angle reference signal. The document therefore describes an approach as to how tower movements can be calculated without the influence thereof coming to bear on the rotational speed feedback control.

EP 2 115 299 B1 relates to the damping of a tower resonance movement in wind turbines using estimation methods, wherein the estimated values are used to provide a correction of the collective pitch angle.

EP 2 063 110 B1 relates to a method for damping tower vibrations of a wind turbine which comprises rotor blades, a pitch controller and an actuator system for setting the pitch angle of the rotor blades, wherein the method has the steps of: providing a speed reference value for the rotor speed; providing a rotor speed value which indicates the speed of the rotor; and producing a modification value which specifies a correction value to be applied to the rotor speed value in order to take into account the tower vibrations; using the modification value to change the speed reference value in order to obtain a changed speed reference value; determining a pitch reference value, which corresponds to a pitch angle to be set by the actuator system, on the basis of at least the difference between the changed speed reference value and the rotor speed value; controlling the pitch angle of the rotor blades in accordance with the pitch reference value.

EP 2 063 110 B1 accordingly estimates the tower movement from a derived movement and position of the tower, and uses this to determine a correction of the reference value of the rotor speed or rotational speed. To decouple the influences of the tower vibration from the rotational speed feedback control, however, a gain factor of the amplifier 25, see FIG. 4 of said document, would have to be optimized, which is nontrivial and is also not described by said document. While the method therefore actively serves to dampen the tower vibrations, it cannot prevent the tower vibration from occurring in the first place as a result of the rotational speed feedback control, because no decoupling of this disturbance variable from the rotational speed feedback control is achieved per se.

The German Patent and Trade Mark Office has searched the following prior art in the priority application relating to the present application: DE 10 2017 105 165 A1, US 2009/0 250 932 A1, US 2010/0 063 769 A1, US 2011/0 316 277 A1, US 2012/0 056 427 A1, US 2014/0 297 052 A1, US 2015/0 354 532 A1.

BRIEF SUMMARY

Provided herein are techniques for improving operation of wind turbines, in particular rotational speed feedback control regimes, as well as associated feedback controller structures and wind turbines, such that the excitation of tower vibrations by the rotational speed feedback control is avoided or at least reduced. Further, provided herein are techniques for avoiding unnecessary disturbance of rotational speed feedback control by the tower of the wind turbine, in particular to reduce unnecessary pitch movements.

According to a first aspect, provided is a method for operating a wind turbine, wherein the wind turbine has a tower with external tower loads acting thereon and has an aerodynamic rotor with rotor blades which are adjustable in terms of their pitch angle, which rotor generates rotor thrust. The method comprises the following steps: a) determining a speed of a tower head of the tower and/or of a nacelle of the wind turbine, b) determining an absolute wind speed in the region of the wind turbine, c) determining a pure wind power on the rotor on the basis of the absolute wind speed; d) determining an apparent wind power on the rotor on the basis of the speed of the tower head and/or of the nacelle; e) determining an aerodynamic tower vibration power on the basis of a difference between the apparent wind power and the pure wind power; and f) performing feedback control of the wind turbine using the aerodynamic tower vibration power.

By determining the aerodynamic tower vibration power from apparent wind power and pure wind power, more precise and faster feedback control of the wind turbine is possible. In particular, the disturbance variable for the feedback control can thus be decoupled, which consequently has the effect that the feedback control, in particular the rotational speed feedback control of the wind turbine, does not stimulate the tower vibrations in the first place. Accordingly, the typically required damping of the tower vibrations loses its importance simply because the tower vibrations are not stimulated in the first place.

The speed of the tower head or the nacelle can be estimated, determined or measured in a known, suitable manner. For this purpose, for example, acceleration sensors may be integrated in the nacelle or in the tower head, or strain gauges may also be provided at any points on the tower.

The tower head or nacelle speed preferably comprises the speed component in the axial direction or longitudinal direction of the nacelle.

The absolute wind speed is preferably ascertained from an apparent wind speed which is estimated, determined or measured by suitable, known methods. For example, anemometers or wind estimators, which estimate the wind from operating parameters of the wind turbine, in particular from loads and/or power levels, may be used for this purpose.

The absolute wind speed is accordingly obtained by virtue of the apparent wind speed being compensated by the speed at which the reference system, in particular the tower head of the wind turbine, moves.

An apparent wind power on the rotor is then determined on the basis of the speed of the tower head and/or of the nacelle and the absolute wind speed.

In another aspect, provided is a method for operating a wind turbine, wherein the wind turbine has a tower with external tower loads acting thereon and has an aerodynamic rotor with rotor blades which are adjustable in terms of their pitch angle, which rotor generates rotor thrust. The method comprises the following steps: a) determining a speed of a tower head of the tower and/or of a nacelle of the wind turbine, b) determining an absolute wind speed in the region of the wind turbine, c) determining a pure wind moment on the rotor on the basis of the absolute wind speed; d) determining an apparent wind moment on the rotor on the basis of the speed of the tower head; e) determining an aerodynamic tower vibration moment on the basis of a difference between the apparent wind moment and the pure wind moment; and f) performing feedback control of the wind turbine using the aerodynamic tower vibration moment.

The method and the advantages associated therewith are largely analogous to the first aspect relating to levels of tower vibration power, with corresponding moments being used instead of the powers. A person skilled in the art is familiar with the conversion between moments and powers, substantially incorporating the rotational speed. Accordingly, in the following, all embodiments and advantages that are described with reference to either a power or a torque are also to be applied analogously to corresponding moments or powers.

In a preferred embodiment, the feedback control of the wind turbine comprises correcting a rotor acceleration, wherein the method further includes: g) correcting the rotor acceleration using the aerodynamic tower vibration power or the aerodynamic tower vibration moment.

In this embodiment, it is accordingly consequently the case that known rotational speed feedback control, which as a corrective measure corrects the rotor acceleration, is implemented by means of the method for performing feedback control of the wind turbine.

In a preferred embodiment, the feedback control of the wind turbine comprises correcting a power of the rotor with the aerodynamic tower vibration power or the aerodynamic tower vibration moment, and performing feedback control of the wind turbine using the corrected power.

In a preferred embodiment, the step of performing feedback control of the wind turbine is performed by means of power feedback control, torque feedback control and/or rotational speed feedback control of the wind turbine, in particular by blade angle adjustment and/or by specification of the generator torque.

In a preferred embodiment, the absolute wind speed is not influenced by the speed of the tower head. In this case, the determination of the absolute wind speed, for example by measurement, may be performed directly without any contribution of the tower head speed, or may be retroactively corrected by the speed of the tower head.

In a preferred embodiment, the absolute wind speed corresponds to a wind speed determined in the region of the wind turbine minus the speed of the tower head and/or of the nacelle of the wind turbine. Here, the wind speed determined in the region of the wind turbine may be measured, estimated or derived in known ways, or determined by a combination of these methods.

In a preferred embodiment, the power comprises an acceleration power of the rotor or a total aerodynamic power of the rotor, or the moment comprises an acceleration moment of the rotor or a total aerodynamic moment of the rotor. The acceleration power or the acceleration moment may be estimated, determined and/or measured by suitable, known methods.

In a preferred embodiment, the power or the moment of the rotor is corrected by the aerodynamic tower vibration power or tower vibration moment, respectively, multiplied by a factor, wherein the multiplication factor is between 0.5 and 5, preferably between 1 and 4, inclusive of the boundary values.

An optimally decoupled disturbance variable is achieved with a multiplication factor of 1; with a value greater than 1, the tower vibration is actively dampened.

In a further aspect, provided is a feedback controller structure for a wind turbine having an aerodynamic rotor with at least one rotor blade. The feedback controller structure is configured to perform feedback control of a rotational speed of the rotor of the wind turbine, wherein the feedback controller structure is configured to receive an input signal which comprises a rotational speed change, a rotational speed acceleration, a function of the rotational speed change and/or a function of the rotational speed acceleration, wherein the feedback controller structure is configured to operate the wind turbine in accordance with a method described herein.

In a preferred embodiment, the feedback controller structure is configured as a cascade feedback controller and has an outer feedback control loop and an inner feedback control loop, wherein the inner feedback control loop receives the input signal.

The cascade feedback controller has the advantage that it allows much faster feedback control than the conventional rotational speed feedback control, because the rotational speed constitutes a relatively sluggish controlled variable. Through the provision of an inner feedback control loop with a reference variable which allows faster adjustment, the loads acting on the wind turbine can be reduced.

In a preferred embodiment, a controlled variable of the outer feedback control loop is provided as a reference variable of the inner feedback control loop, and the outer feedback control loop is configured to specify a limitation of the controlled variable, in particular of the rotational speed change, of the rotational speed acceleration, of the function of the rotational speed change and/or of the function of the rotational speed acceleration.

This configuration allows a limitation of the maximum rotor acceleration and thus of the acting loads.

In a preferred embodiment, the input signal of the inner feedback control loop comprises a rotor acceleration power or a rotor acceleration moment, wherein the rotor acceleration power or the rotor acceleration moment describes that fraction of a power or torque consumed by the rotor of the wind turbine which is converted into an acceleration of the rotor, wherein the rotor acceleration power or the rotor acceleration moment is corrected by means of the method described herein.

In a preferred embodiment, the input signal of the inner feedback control loop comprises an aerodynamic power consumed by the rotor, wherein the aerodynamic power consumed by the rotor comprises a sum of a rotor acceleration power and of at least one power consumed by a further component of the wind turbine, in particular a generator power of a generator of the wind turbine, wherein the rotor acceleration power describes that fraction of a power consumed by the rotor of the wind turbine which is converted into an acceleration of the rotor.

In a preferred embodiment, the outer feedback control loop determines a deviation of an actual rotational speed of the rotor from a setpoint rotational speed of the rotor as a control deviation.

In a preferred embodiment, the outer feedback control loop generates a setpoint value of a power or of a moment as a manipulated variable, wherein the setpoint value of the power is in particular upwardly and downwardly asymmetrically limited, wherein the power comprises a rotor acceleration power, wherein the rotor acceleration power is limited to a nominal power of the wind turbine, in particular to at most 40%, preferably at most 30% and particularly preferably at most 20% of the nominal power of the wind turbine.

In a preferred refinement, the power comprises an aerodynamic rotor power, wherein the aerodynamic rotor power is limited to twice a nominal power of the wind turbine, in particular to at most 120% of the nominal power of the wind turbine.

In a preferred embodiment, the inner feedback control loop generates a pitch angle or a rate of change of a pitch angle of at least one of the rotor blades of the rotor as a manipulated variable, wherein the setpoint value of the rate of change of the pitch angle is limited to a value between −20°/s and +20°/s, preferably between −10°/s and +10°/s and in particular between −5°/s and +5°/s.

In a preferred embodiment, the outer feedback control loop and/or the inner feedback control loop has a P and/or I controller. The selection of feedback controller is closely related to the selection of the manipulated variable. In the case of feedback controller structures with pitch rates as a manipulated variable, P controllers are preferred, and in the case of feedback controller structures with pitch angles as a manipulated variable, I controllers are preferred.

In a preferred embodiment, the feedback controller structure furthermore has a calculation component which is configured to determine a rotor acceleration power from a change in a measured actual rotational speed of the wind turbine using the rotor inertia.

In a preferred embodiment, the feedback controller structure furthermore has a feedforward controller for the feedforward control of a pitch angle of at least one rotor blade, which feedforward controller is configured to specify a pitch angle and/or a rate of change of the pitch angle in parallel with respect to the inner feedback control loop.

For the setpoint value of the aerodynamic power, a setpoint pitch angle is preferably determined for this purpose, which setpoint pitch angle is set off against the actual pitch angle to form a feedforward control pitch rate. Both pitch rates, that is to say the pitch rate of the rotational speed feedback controller and the pitch rate of the feedforward controller, run in parallel and are superimposed, wherein this implementation is then a question of the design of the wind turbine.

Provided is a wind turbine with a feedback controller structure.

Provided is a wind farm with multiple wind turbines.

The preferred embodiments of the method and of the feedback controller structure may be combined and exchanged as desired while achieving the advantages respectively associated therewith, and may likewise be used for the embodiment of the wind turbine and of the wind farm.

BRIEF DESCRIPTION OF THE SEVERAL VIEWS OF THE DRAWINGS

Further advantages and exemplary embodiments will be described below with reference to the accompanying figures. In the drawings.

DETAILED DESCRIPTION

Figure 1:
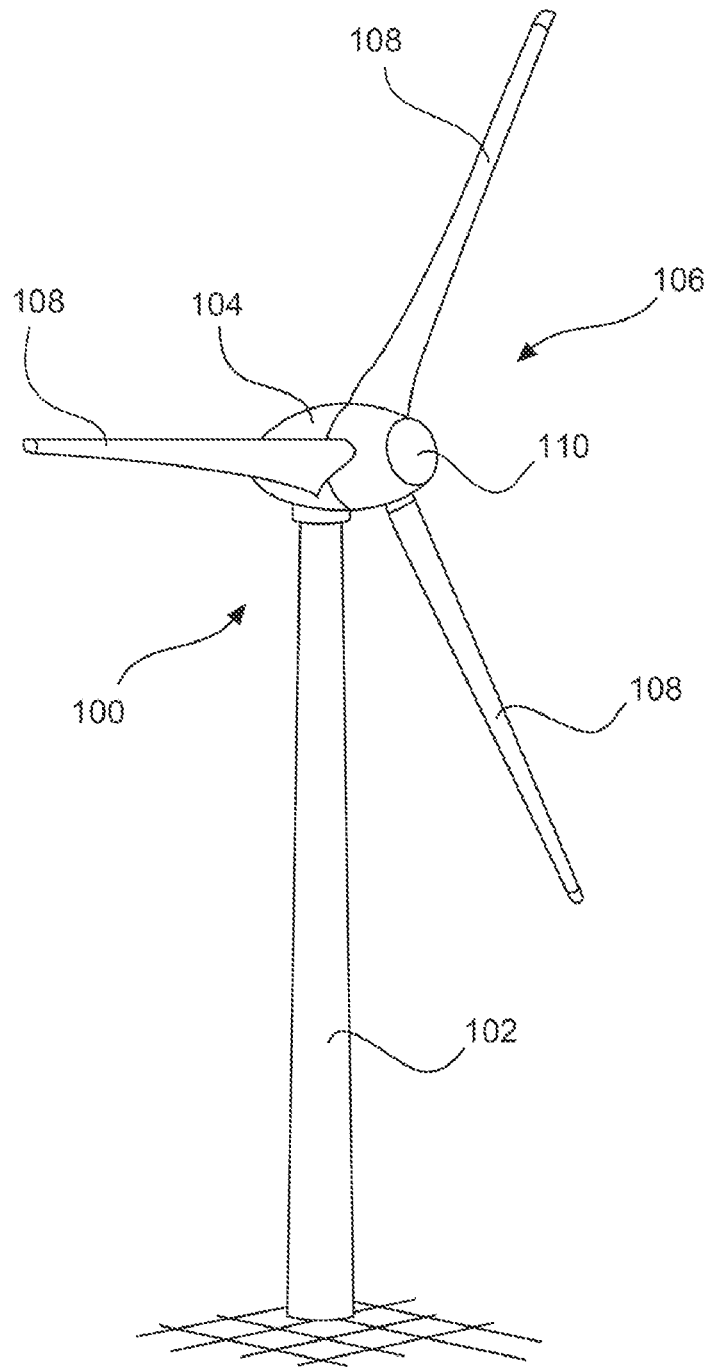
FIG. 1 shows a wind turbine, schematically and by way of example.

FIG. 1 is a schematic illustration of a wind turbine. The wind turbine 100 has a tower 102 and a nacelle 104 on the tower 102. An aerodynamic rotor 106 having three rotor blades 108 and having a spinner 110 is provided on the nacelle 104. During the operation of the wind turbine, the aerodynamic rotor 106 is set in rotational motion by the wind and thereby also rotates an electrodynamic rotor or armature of a generator, which is coupled directly or indirectly to the aerodynamic rotor 106. The electric generator is arranged in the nacelle 104 and generates electrical energy. The pitch angles of the rotor blades 108 may be changed by pitch motors at the rotor blade roots of the respective rotor blades 108.

The tower 102, in particular, is caused to vibrate by the thrust generated by the aerodynamic rotor 106. A main movement direction of the tower vibration is in the direction of the incident wind or of the azimuth setting of the nacelle 104. Owing to the vibration of the tower 102, non-negligible loads act on the tower 102. These loads are of crucial importance for the design of tower 102.

Feedback controller structures (e.g., feedback controllers) for the operation of wind turbines are known. So-called pitch-controlled wind turbines, in the case of which the rotor blades of the rotor of the wind turbine are adjustable about their longitudinal axis, the so-called pitch axis, are the most widely used. Through the variation of the pitch angle, an aerodynamic power of the rotor blades is varied, which allows the power to be limited to the nominal power when nominal wind is reached.

Figure 2:
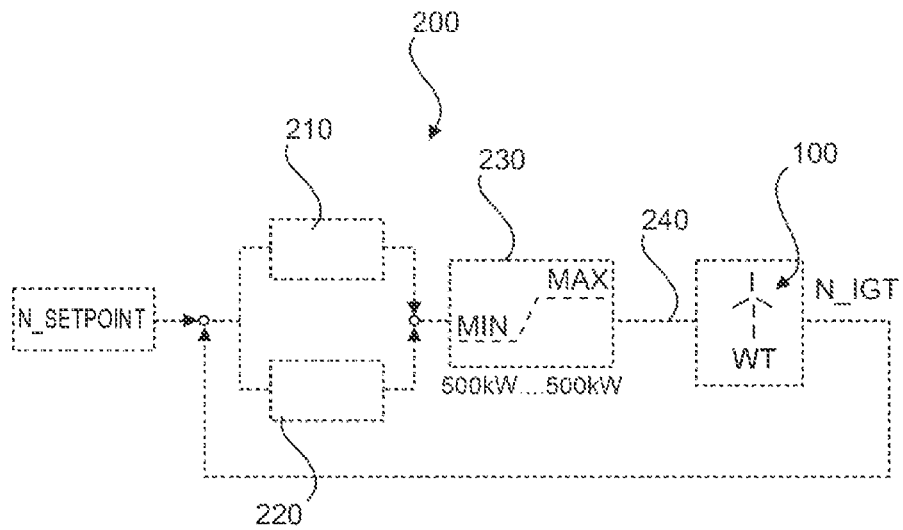
FIG. 2 shows a feedback controller structure for rotational speed feedback controllers of wind turbines, schematically and by way of example.

For this purpose, it is known to provide so-called rotational speed feedback controllers, as shown schematically in FIG. 2, in order to approximately maintain a setpoint rotational speed $N_{setpoint}$. The rotational speed feedback controller (e.g., feedback controller) 200 is configured to adjust to the setpoint rotational speed $N_{setpoint}$ as reference variable where possible, wherein an actual rotational speed $N_{actual}$ measured by the wind turbine 100 is fed back and the deviation is converted by means of a P controller 210 and a D controller 220 into a pitch rate to be set. The pitch rate is set, in a manner limited by a pitch rate limiter (e.g., clipper or amplifier) 230, to a setpoint pitch rate 240, which is then used for the operation of the wind turbine 100.

The quality of the feedback control of the rotational speed directly influences the sectional loads of important components of the wind turbine, for example of the tower and of the rotor blades.

Figure 3:
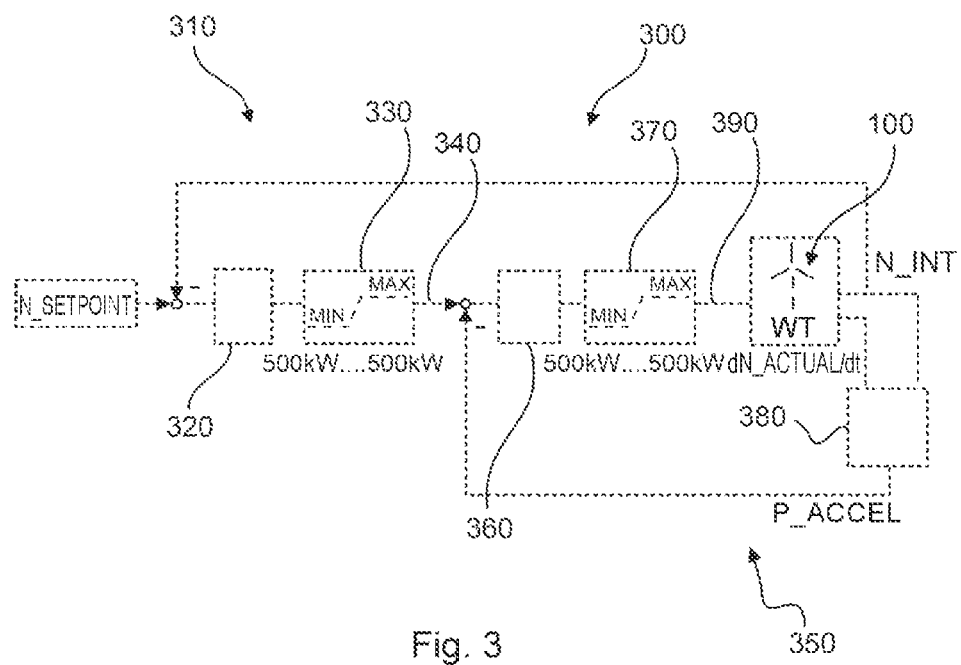
FIG. 3 shows an improved feedback controller structure, schematically and by way of example.

FIG. 3 shows an improved feedback controller structure (e.g., feedback controller) 300 for a wind turbine 100, as is shown for example in FIG. 1, schematically and by way of example. The feedback controller structure 300 is configured as a cascade feedback controller and has an outer feedback control loop 310 and an inner feedback control loop 350. The feedback controller structure 300 adjusts a rotational speed in the wind turbine by feedback control to a setpoint value $N_{setpoint}$ For this purpose, the outer feedback control loop 310 compares the actual rotational speed $N_{actual}$ with the setpoint rotational speed $N_{setpoint}$ that is to be adjusted to, and generates a setpoint value 340 of rotor acceleration power $P_{accel\_setpoint}$ by means of a signal of a P controller 320, said signal being limited by a limiter (e.g., clipper or amplifier) 330.

The inner feedback control loop 350 now adjusts to the rotor acceleration power $P_{accel}$ by feedback control, and accordingly seeks to position the rotor blades of the wind turbine 100 such that the rotor 106 accelerates as little as possible, or follows the setpoint value 340 of the rotor acceleration power $P_{accel\_setpoint}$. For this purpose, an actual acceleration power $P_{accel}$ is determined by means of a calculation unit (e.g., processor, central processing unit (CPU), controller or arithmetic logic unit (ALU))380, for example on the basis of the change with respect to time of the rotor rotational speed $dN_{actual}/dt$, by means of a calculation unit 380. The difference between the setpoint value 340 of the acceleration power $P_{accel\_setpoint}$ and the ascertained actual value $P_{accel}$ is converted by means of a P controller 360 into a pitch rate to be set, or a blade angle to be set, of the rotor blades 108. The pitch rate to be set or the pitch angle to be set is limited by a limiter (e.g., clipper or amplifier) 370, said pitch rate or pitch angle then being transmitted as a setpoint value 390 to the controller of the wind turbine 100.

In this example, the calculation unit 380 makes use of known physical relationships between the moment of inertia J that is known for the rotor, a torque M, and a rotational speed or angular speed ω derived therefrom, in order to calculate the actual acceleration power $P_{accel}$ from the change in the rotational speed.

Instead of the rotor acceleration power, as described in the exemplary embodiment, it is also possible to use the total aerodynamic power consumed by the rotor, that is to say to consider this in addition to the power consumed by the generator. One advantage of the rotor acceleration power is in many cases that the variable is often commonly already available for wind estimators used in the control of wind turbines 100, that is to say a more extensive adaptation of the control of the wind turbine 100 is not required. It is accordingly sufficient to simply replace the known rotational speed feedback controller with a feedback controller structure 300. Wind estimators are also known, for example, from the German patent publication DE 10 2017 105 165 A1.

As an alternative to powers, the feedback controller structure 300 presented by way of example may also be implemented with moments or rotational speeds derived with respect to time. These solutions are identical aside from the fact that the present rotational speed is also incorporated into the acceleration power. It is however well known how powers can be converted into moments and vice versa.

The inner feedback control loop 350, taken on its own, would lead to severe rotational speed errors over time, such that the outer feedback control loop 310, which reacts much more slowly and more sluggishly, generates a setpoint value for the acceleration power that may deviate from 0 kilowatt (kW). For example, if a situation of excessive rotational speed arises, that is to say if the actual rotational speed $N_{actual}$ is higher than the setpoint rotational speed $N_{setpoint}$, then the setpoint value 340 would for example be –200 kW. The inner feedback control loop 350 would in this case adjust to an approximate rotor acceleration power $P_{accel}$ of –200 kW, such that the rotor 106 reduces its rotational speed as a result.

The limitation of the output of the rotational speed feedback controller by the limiters 330 or 370 allows the maximum acceleration power to be limited, which likewise has a load-reducing effect.

The feedback controller structure 300 shown schematically in FIG. 3 may particularly advantageously be supplemented by a feedforward controller arranged in parallel with respect to the inner feedback control loop 350. The feedforward controller may for example feed forward impending wind gusts and accordingly intervene actively in the pitch angle actuation in addition to the feedback control. In this way, extreme loads such as those resulting from strong wind gusts can be avoided in a particularly effective manner.

In summary, the feedback controller structure as per FIG. 3 accordingly means a feedback controller structure 300 for adjusting the rotational speed by feedback control to a rotational speed setpoint value $N_{setpoint}$ The inner feedback control loop 350 receives the aerodynamic power consumed by the rotor 106 or the acceleration power, or in simplified form also merely the rotor acceleration, as a controlled variable, wherein the pitch rate or alternatively also a setpoint rotor blade angle serves as manipulated variable. The outer feedback control loop 310 performs feedback control of the rotor rotational speed N as controlled variable, wherein a setpoint value of the aerodynamic power, of the acceleration power or else of the setpoint rotor acceleration are generated as manipulated variable for the inner feedback control loop 350.

Figure 4:
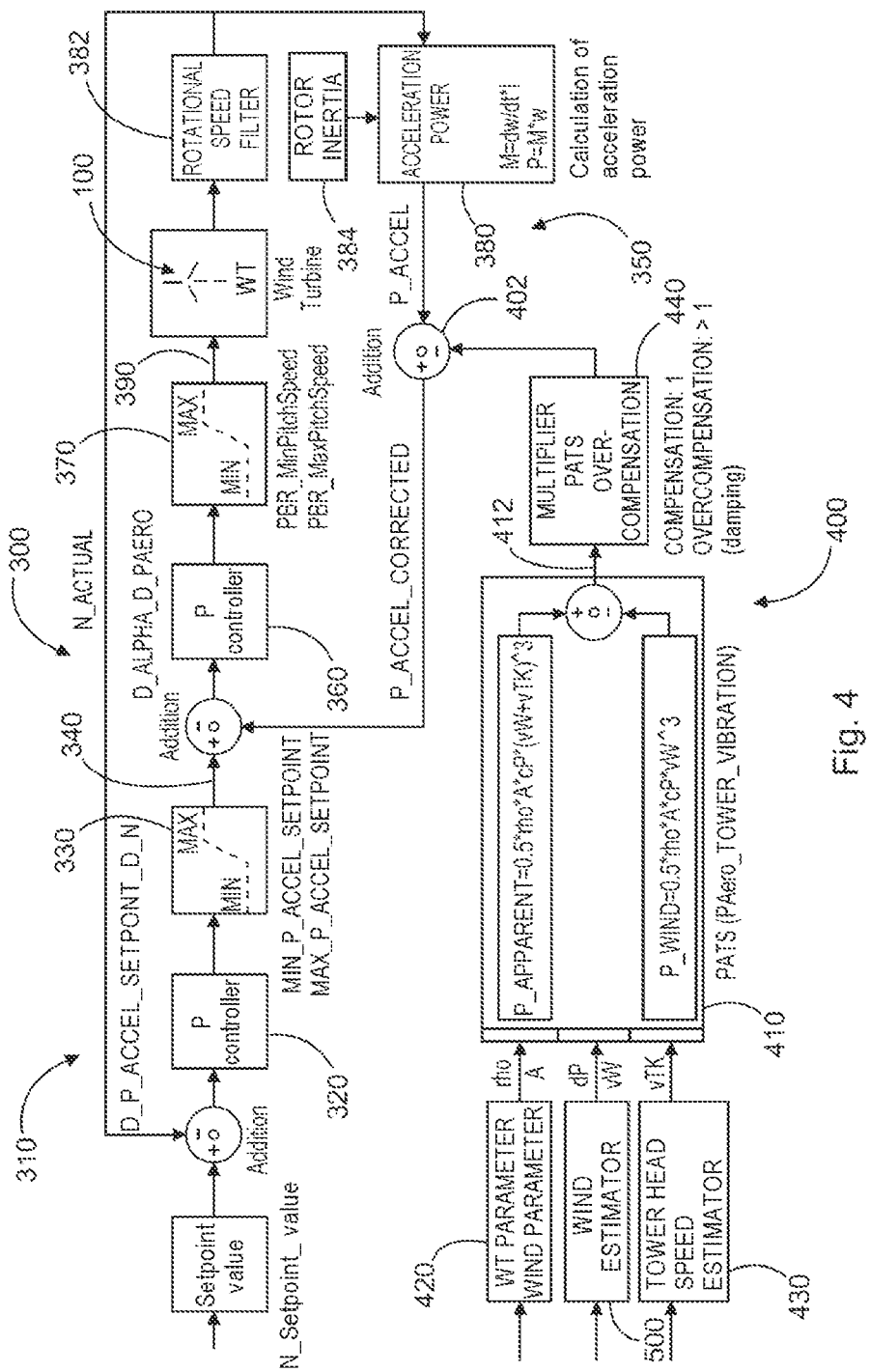
FIG. 4 shows a feedback controller structure with correction, schematically and by way of example.

FIG. 4 shows an integration of a method for operating a wind turbine 100 into the feedback controller structure 300 shown in FIG. 3, schematically and by way of example. Instead of the feedback control structure 300 shown in FIG. 3, it is also possible by means of the method to modify all other known feedback controller structures that are configured in particular for performing feedback control of the rotor rotational speed N of a wind turbine 100. As also described in conjunction with the feedback controller structure 300, it is likewise possible, instead of the acceleration power presented there by way of example or some other power, to use moments or variables derived therefrom.

FIG. 4 shows a correction device (e.g., controller) 400, which integrates a correction value for the acceleration power $P_{accel}$ into the inner feedback control loop 350 at a point 402. The result is accordingly a correction value 402 for the acceleration power $P_{accel}$, wherein the method is likewise applicable analogously to moments.

The correction value 402 physically corresponds to an aerodynamic power that originates from the vibration of the tower of the wind turbine 100, referred to as aerodynamic tower vibration power $P_{AT}$. For this purpose, an apparent wind power $P_{apparent}$ and a pure wind power $P_{wind}$ are calculated by means of a calculation unit (e.g., processor, central processing unit (CPU), controller or arithmetic logic unit (ALU)) 410, for example by means of the following formulae:

$$P_{apparent} = 0.5 * \rho * A * c_p * (v_W + v_{TH})^3 \quad (1)$$

$$P_{Wind} = 0.5 * \rho * A * c_p * v_w^3 \quad (2)$$

$$P_{AT} = P_{apparent} - P_{Wind} \quad (3)$$

Parameters of the wind turbine, such as an air density ρ and a rotor surface area A, which are provided by a parameter unit (e.g., memory) 420 are firstly used as input variables of the calculation unit 410. A tower head speed estimate 430 provides the tower head speed $v_{TK}$. This is determined for example by means of an acceleration sensor that is fastened in the tower head or on the nacelle. Other methods for estimating the tower head speed, for example using strain gauges which are arranged at the tower base or in the tower, are also known.

Finally, a wind speedy, which is not influenced by the tower head speed is provided by a wind estimator (e.g., processor, computer or controller) 500. The wind estimator 500 will be described in detail later with reference to FIG. 5. Instead of wind estimators 500, other methods for providing a wind speed $v_w$, are also suitable, for example methods on the basis of anemometers or similar measuring devices. The wind speed v provided by the wind estimator 500 is either ascertained directly without the influence of the tower head speed or, alternatively, the tower head speed $v_{TH}$ is retroactively subtracted from the wind speed $v_w$.

The calculation unit 410 then determines the apparent wind power $P_{apparent}$ from a difference between the wind speed $v_w$ and the tower head speed $v_{TH}$. Additionally, the pure wind power $P_{wind}$ is determined exclusively from the wind speed $v_w$.

The difference between the two powers is then calculated by the calculation unit 410 as an aerodynamic tower vibration power $P_{AT}$. The aerodynamic tower vibration power $P_{AT}$ 412 is transmitted to a multiplier 440 which, depending on the multiplication factor, allows $P_{AT}$ compensation (multiplication factor equal to 1) or $P_{AT}$ overcompensation (modification factor greater than 1, preferably between 1 and 4). The $P_{AT}$ compensation is a pure decoupling of disturbance variables, whereas, in the case of the $P_{AT}$ overcompensation, damping of $P_{AT}$ is performed.

Accordingly, an acceleration power $P_{accel_{corrected}}$ reduced by the output of the multiplier 440 is supplied as controlled variable to the inner feedback control loop 530.

The calculation unit 410 and the further units 420, 430, 500 may be integrated in one and the same calculation device as the calculation unit 380. For example, a central processor of the wind turbine 100 can perform all of the functions. Alternatively, one, several or all of the functions may also be distributed over multiple calculation units. It is also likewise possible to carry out the calculations partially or even entirely on devices which are arranged remotely from the wind turbine 100. For example, servers or similar structures may be suitable for this.

Figure 5:
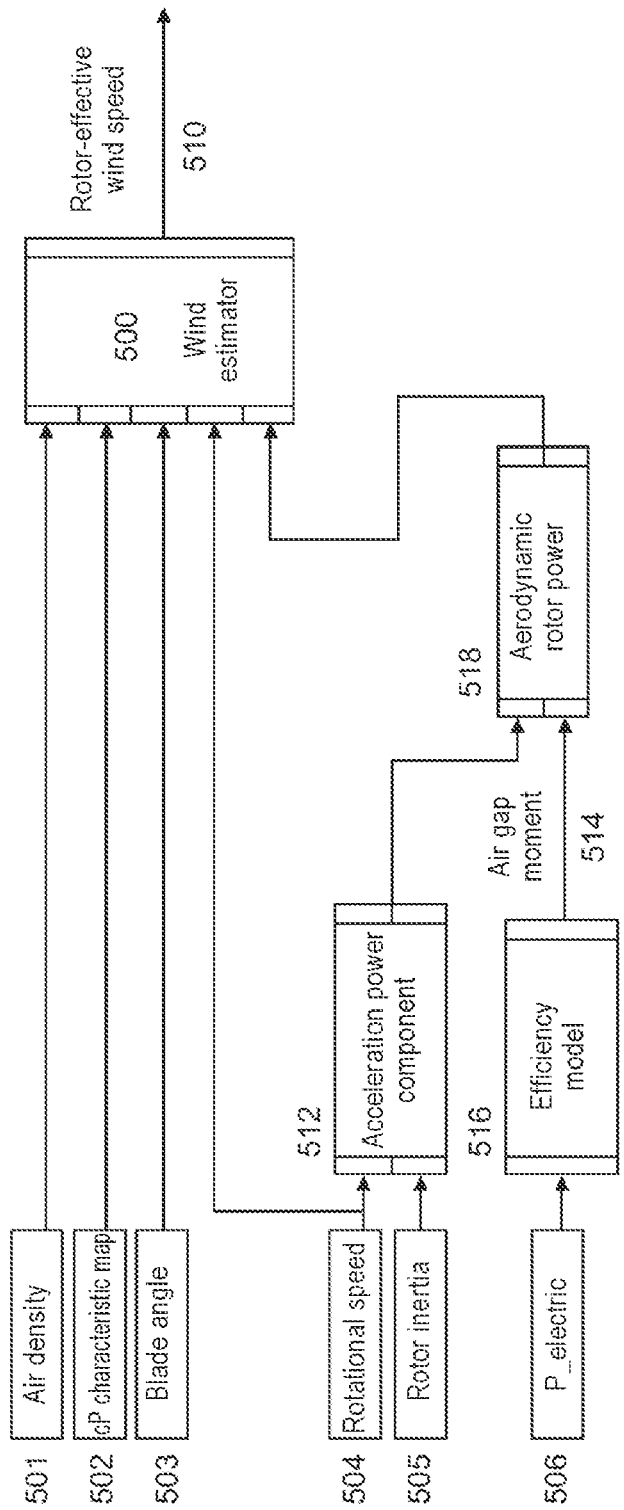
FIG. 5 shows a wind estimator, schematically and by way of example.

FIG. 5 shows a wind estimator (e.g., processor, computer or controller) 500 schematically and by way of example. The wind estimator 500 processes different input variables in order to obtain a rotor-effective wind speed 510.

Firstly, the wind estimator 500 receives an air density 501, a cP characteristic map 502 and a presently applied blade angle of the rotor blades 503.

A rotational speed 504, a rotor inertia 505 and the electrical power 506 are incorporated as further parameters into the wind estimator 500. The rotational speed 504 and the rotor inertia 505 are converted into a power component for the acceleration 512 and combined with an air gap moment 514, which was derived from the electrical power 506 by means of an efficiency model 516, to form the aerodynamic power of the rotor 518.

Figure 6:
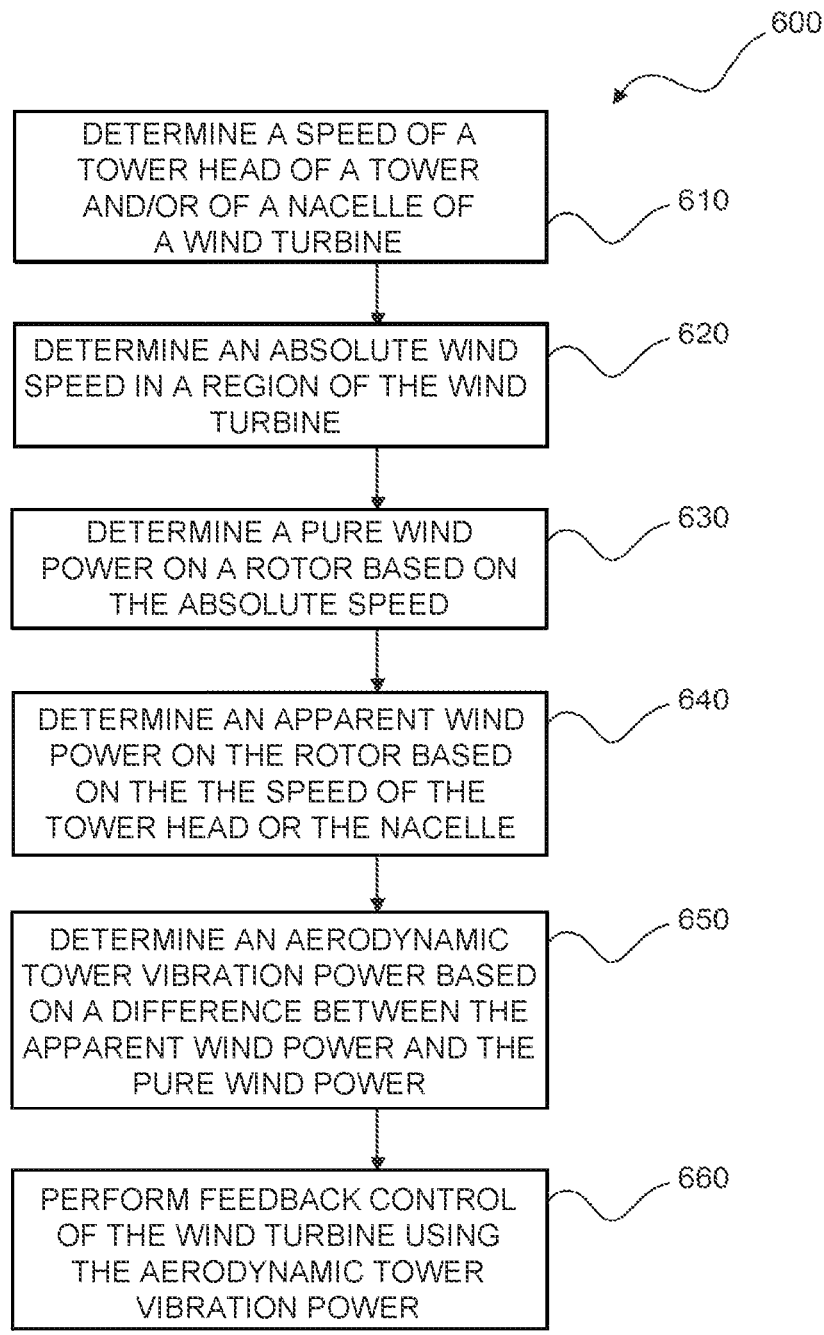
FIG. 6 shows a flow diagram of a method for operating a wind turbine, schematically and by way of example.

FIG. 6 shows, schematically and by way of example, a flow diagram of a method 600 for operating a wind turbine, for example the wind turbine 100.

The method initially has a step 610 of determining a speed of a tower head of the tower 102 and/or of a nacelle of the wind turbine 100. The speed of the tower head or of the nacelle is for example estimated, determined and/or measured. As mentioned, acceleration sensors, strain gauges or other devices are suitable for this.

Then, in a step 620, an absolute wind speed $v_w$, in the region of the wind turbine 100 is determined. The absolute wind speed $v_w$, may also be estimated, for example by means of a wind estimator 500, determined and/or measured. The influence of a speed of the tower head is not included in, or is subtracted from, the absolute wind speed $v_w$.

In a step 630, a pure wind power $P_{wind}$ on the rotor 106 is determined on the basis of the absolute speed. As an alternative to the wind power $P_{wind}$, it is likewise possible in this step to determine a pure wind moment on the basis of the absolute wind speed $v_w$.

In a step 640, an apparent wind power $P_{apparent}$ on the rotor 106 is determined on the basis of the speed of the tower head or the nacelle. For the apparent wind power $P_{apparent}$, a sum of the absolute wind speed $v_w$ and the tower head speed $v_{TH}$ is of particular relevance. Aside from this, the calculation of the pure wind power $P_{wind}$ and the calculation of the apparent wind power $P_{apparent}$ are analogous in terms of formulae. Accordingly, in this step, too, the corresponding moment may be determined in the same way instead of a power.

In a step 650, an aerodynamic tower vibration power $P_{AT}$ is determined on the basis of a difference between the apparent wind power $P_{apparent}$ and the pure wind power $P_{wind}$. The determination of an aerodynamic tower vibration moment is analogously possible for the apparent wind moments and pure wind moments.

In a step 660, feedback control of the wind turbine 100 is performed using the aerodynamic tower vibration power $P_{AT}$, for example such as described with reference to FIG. 4.

The invention claimed is:
1. A method for operating a wind turbine, comprising:
    determining a speed of a tower head of a tower and/or a nacelle of the wind turbine, wherein external tower loads act on the tower, the wind turbine has an aero- dynamic rotor including a plurality of rotor blades that have adjustable pitch angles, and the rotor is configured to generate rotor thrust;
determining an absolute wind speed in a region of the wind turbine;
determining a pure wind power on the rotor based on the absolute wind speed;
determining an apparent wind power on the rotor based on the speed of the tower head and/or the nacelle;
determining an aerodynamic tower vibration power based on a difference between the apparent wind power and the pure wind power; and
performing feedback control of the wind turbine using the aerodynamic tower vibration power.

2. The method as claimed in claim 1, wherein:
the feedback control of the wind turbine includes correcting a rotor acceleration, and
the method includes:
correcting the rotor acceleration using the aerodynamic tower vibration power.

3. The method as claimed in claim 1, wherein the feedback control of the wind turbine includes:
correcting a power of the rotor with the aerodynamic tower vibration power; and
performing the feedback control of the wind turbine using the corrected power.

4. The method as claimed in claim 3, wherein the power of the rotor includes an acceleration power of the rotor or a total aerodynamic power of the rotor.

5. The method as claimed in claim 3, wherein the power of the rotor is corrected by the aerodynamic tower vibration power multiplied by a factor that is between 0.5 and 5.

6. The method as claimed in claim 1, wherein performing the feedback control of the wind turbine includes performing power feedback control, torque feedback control and/or rotational speed feedback control of the wind turbine.

7. The method as claimed in claim 6, wherein performing the power feedback control, the torque feedback control and/or the rotational speed feedback control of the wind turbine includes performing blade angle adjustment and/or specifying generator torque.

8. The method as claimed in claim 1, wherein the absolute wind speed is not influenced by the speed of the tower head.

9. The method as claimed in claim 1, wherein the absolute wind speed corresponds to a wind speed determined in region of the wind turbine minus the speed of the tower head and/or the nacelle of the wind turbine.

10. A method for operating a wind turbine, comprising:
determining a speed of a tower head of a tower and/or a nacelle of the wind turbine wherein external tower loads act on the tower, the wind turbine has an aerodynamic rotor including a plurality of rotor blades that have adjustable pitch angles, and the rotor is configured to generate rotor thrust;
determining an absolute wind speed in a region of the wind turbine,
determining a pure wind moment on the rotor based on the basis the absolute wind speed;
determining an apparent wind moment on the rotor based on the speed of the tower head;
determining an aerodynamic tower vibration moment based on a difference between the apparent wind moment and the pure wind moment; and
performing feedback control of the wind turbine using the aerodynamic tower vibration moment.

11. The method as claimed in claim 10, wherein:
the feedback control of the wind turbine includes correcting a rotor acceleration, and
the method includes:
correcting the rotor acceleration using the aerodynamic tower vibration moment.

12. The method as claimed in claim 10, wherein the feedback control of the wind turbine includes:
correcting a moment of the rotor with the aerodynamic tower vibration moment; and
performing the feedback control of the wind turbine using the corrected moment.

13. The method as claimed in claim 12, wherein the moment includes an acceleration moment of the rotor or a total aerodynamic moment of the rotor.

14. The method as claimed in claim 12, wherein the moment of the rotor is corrected by the aerodynamic tower vibration moment multiplied by a factor that is between 0.5 and 5.

15. A feedback controller for a wind turbine, comprising:
an input configured to receive an input signal which includes a rotational speed change, a rotational speed acceleration, a function of the rotational speed change and/or a function of the rotational speed acceleration, wherein the wind turbine has an aerodynamic rotor including at least one rotor blade, wherein the feedback controller is configured to:
determine a speed of a tower head of a tower and/or a nacelle of the wind turbine;
determine an absolute wind speed in a region of the wind turbine;
determine a pure wind power or a pure wind moment on the rotor based on the absolute wind speed;
determine an apparent wind power or an apparent wind moment on the rotor based on the speed of the tower head and/or the nacelle;
determine an aerodynamic tower vibration power based on a difference between the apparent wind power and the pure wind power or determining an aerodynamic tower vibration moment based on a difference between the apparent wind moment and the pure wind moment and
perform feedback control of a rotational speed of the rotor using the aerodynamic tower vibration power or the aerodynamic tower vibration moment.

16. The feedback controller as claimed in claim 15, wherein:
the feedback controller is configured as a cascade feedback controller and has an outer feedback control loop and an inner feedback control loop,
the inner feedback control loop receives the input signal.

17. The feedback controller as claimed in claim 16, wherein:
the input signal of the inner feedback control loop includes an aerodynamic power consumed by the rotor, wherein
the aerodynamic power consumed by the rotor includes a sum of a rotor acceleration power and of at least one power consumed by a further component of the wind turbine, and
the rotor acceleration power represents a fraction of a power consumed by the rotor of the wind turbine that is converted into an acceleration of the rotor.

18. The feedback controller as claimed in claim 16, wherein the outer feedback control loop determines a deviation of an actual rotational speed of the rotor from a setpoint rotational speed of the rotor as a control deviation.

19. The feedback controller as claimed in claim 16, wherein:
the outer feedback control loop generates a setpoint value of a power or of a moment as a manipulated variable, wherein the setpoint value of the power is upwardly and downwardly asymmetrically limited,
the power includes a rotor acceleration power, and
the rotor acceleration power is limited to at most 40% of a nominal power of the wind turbine.

20. The feedback controller as claimed in claim 19, wherein the power includes an aerodynamic rotor power that, is limited to twice a nominal power of the wind turbine.

21. The feedback controller as claimed in claim 16, wherein the inner feedback control loop generates a pitch angle or a rate of change of the pitch angle of the at least one of the rotor blade of the rotor as a manipulated variable, wherein a setpoint value of the rate of change of the pitch angle is limited to a value between −5 degrees/second and +5 degrees/second.

22. The feedback controller as claimed in claim 16, wherein the outer feedback control loop and/or the inner feedback control loop have a P controller and/or an I controller.

23. The feedback controller as claimed in claim 16, wherein the feedback controller is configured to feedforward control a pitch angle of the at least one rotor blade and specify the pitch angle and/or a rate of change of the pitch angle in parallel with the inner feedback control loop.

24. The feedback controller as claimed in claim 16, wherein a controlled variable of the outer feedback control loop is provided as a reference variable of the inner feedback control loop, and the outer feedback control loop is configured to specify a limitation of the controlled variable, wherein the limitation is of the rotational speed change, the rotational speed acceleration, the function of the rotational speed change and/or the function of the rotational speed acceleration.

25. The feedback controller as claimed in claim 16, wherein:
the input signal of the inner feedback control loop includes a rotor acceleration power or a rotor acceleration moment,
the rotor acceleration power or the rotor acceleration moment represents a fraction of a power or torque consumed by the rotor of the wind turbine which is converted into an acceleration of the rotor, and
the rotor acceleration power or the rotor acceleration moment is corrected by the feedback controller.

26. The feedback controller as claimed in claim 15, wherein the feedback controller is configured to determine a rotor acceleration power from a change in a measured rotational speed of the wind turbine using a rotor inertia.

27. A wind turbine, comprising:
the feedback controller as claimed in claim 15.

28. A wind farm, comprising:
a plurality of wind turbines including the wind turbine as claimed in claim 27.

* * * * *

UNITED STATES PATENT AND TRADEMARK OFFICE
CERTIFICATE OF CORRECTION

PATENT NO. : 11,815,066 B2
APPLICATION NO. : 17/435599
DATED : November 14, 2023
INVENTOR(S) : Enno Von Aswege Page 1 of 1

It is certified that error appears in the above-identified patent and that said Letters Patent is hereby corrected as shown below:

In the Claims

Column 11, Claim 9, Lines 47-48:
"determined in region of the wind turbine"
Should read:
--determined in the region of the wind turbine--.

Column 11, Claim 10, Lines 59-60:
"rotor based on the basis the absolute wind speed;"
Should read:
--rotor based on the absolute wind speed;--.

Column 12, Claim 15, Lines 41-42:
"wind moment and"
Should read:
--wind moment; and--.

Signed and Sealed this
Twenty-second Day of July, 2025

Coke Morgan Stewart
*Acting Director of the United States Patent and Trademark Office*